United States Patent
Thomas (10) Patent No.: US 11,390,244 B2
(45) Date of Patent: Jul. 19, 2022

(54) CAM BASED SEAT BELT PRETENSIONER

(71) Applicant: GM Global Technology Operations LLC, Detroit, MI (US)

(72) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 16/709,405

(22) Filed: Dec. 10, 2019

(65) Prior Publication Data

US 2021/0170987 A1    Jun. 10, 2021

(51) Int. Cl.
    *B60R 22/195*    (2006.01)

(52) U.S. Cl.
    CPC .................. *B60R 22/1952* (2013.01)

(58) Field of Classification Search
    CPC .................. B60R 22/195; B60R 22/1952
    See application file for complete search history.

(56) References Cited

U.S. PATENT DOCUMENTS

| | | | | |
|---|---|---|---|---|
| 5,188,425 A * | 2/1993 | Foster | ............... | B60R 22/1952 297/473 |
| 5,195,694 A * | 3/1993 | Watanabe | ............... | B60R 22/42 242/374 |
| 5,290,062 A * | 3/1994 | Fohl | ............... | B60R 22/1953 297/480 |
| 5,340,152 A * | 8/1994 | Fohl | ............... | B60R 22/28 280/805 |
| 5,364,129 A * | 11/1994 | Collins | ............... | B60R 22/1952 180/268 |
| 5,496,068 A * | 3/1996 | Ball | ............... | A44B 11/2523 24/633 |
| 5,522,619 A * | 6/1996 | Collins | ............... | A44B 11/2503 24/633 |
| 5,634,690 A * | 6/1997 | Watanabe | ............... | B60R 22/1952 242/374 |
| 5,667,246 A * | 9/1997 | Miller, III | ............... | B60R 22/195 280/735 |
| 5,676,397 A * | 10/1997 | Bauer | ............... | B60R 22/1952 242/374 |
| 5,794,978 A * | 8/1998 | Nishide | ............... | B60R 22/1952 280/806 |
| 6,068,664 A * | 5/2000 | Meyer | ............... | B60R 22/1952 280/806 |
| 6,113,145 A * | 9/2000 | Evans | ............... | B60R 22/1952 280/806 |
| 6,237,958 B1 * | 5/2001 | Patrickson | ............... | B60R 22/1952 180/371 |

(Continued)

FOREIGN PATENT DOCUMENTS

| DE | 69402817 | 11/2000 |
|---|---|---|
| DE | 102011051297 A1 | 6/2012 |

OTHER PUBLICATIONS

The German Patent and Trade Mark Office. Notification of exam for DE Application No. 102020129702.5, dated Apr. 13, 2022, pp. 1-4.

*Primary Examiner* — Barry Gooden, Jr.
(74) *Attorney, Agent, or Firm* — Vivacqua Crane, PLLC (57) ABSTRACT

A seat belt pretensioner for a motor vehicle includes a cam that rotates, a cable with a first end and a second end, a section of the cable positioned on an outer portion of the cam. Upon deployment the cam rotates and guides the first end from a first location to a second location.

20 Claims, 12 Drawing Sheets

(56) References Cited

U.S. PATENT DOCUMENTS

| | | | |
|---|---|---|---|
| 6,340,176 B1* | 1/2002 | Webber | B60R 22/1952 |
| | | | 280/805 |
| 6,419,271 B1* | 7/2002 | Yamada | B60R 22/1952 |
| | | | 280/801.1 |
| 6,460,935 B1* | 10/2002 | Rees | B60R 22/1952 |
| | | | 280/806 |
| 6,851,715 B2* | 2/2005 | Devereaux | B60R 22/18 |
| | | | 280/806 |
| 6,866,296 B2* | 3/2005 | Webber | B60R 22/1952 |
| | | | 280/806 |
| 7,188,868 B2* | 3/2007 | Yamaguchi | B60R 22/195 |
| | | | 280/806 |
| 7,350,734 B2 | 4/2008 | Stevens | |
| 8,528,987 B2* | 9/2013 | Cahill | B60R 22/1955 |
| | | | 297/480 |
| 8,585,090 B2* | 11/2013 | Lane, Jr. | B60R 22/1952 |
| | | | 280/806 |
| 8,888,137 B2* | 11/2014 | Rao | B60R 22/1952 |
| | | | 280/806 |
| 9,511,742 B2* | 12/2016 | Leckliter | B60R 22/18 |
| 2003/0047931 A1* | 3/2003 | Rees | B60R 22/1952 |
| | | | 280/806 |
| 2003/0090100 A1* | 5/2003 | Webber | B60R 22/1952 |
| | | | 280/806 |
| 2003/0184076 A1* | 10/2003 | Devereaux | B60R 22/1952 |
| | | | 280/806 |
| 2004/0094946 A1* | 5/2004 | Prentkowski | B60R 22/1952 |
| | | | 280/806 |
| 2004/0232670 A1* | 11/2004 | Devereaux | B60R 21/0152 |
| | | | 280/735 |
| 2004/0256850 A1* | 12/2004 | Yamaguchi | B60R 22/1952 |
| | | | 280/806 |
| 2007/0029775 A1* | 2/2007 | Tomita | B60R 22/1952 |
| | | | 280/806 |
| 2008/0012283 A1* | 1/2008 | Woecht | B60R 22/1955 |
| | | | 280/806 |
| 2010/0270414 A1* | 10/2010 | Harada | B60R 22/46 |
| | | | 242/390.2 |
| 2011/0316265 A1* | 12/2011 | Lane, Jr. | B60R 22/1955 |
| | | | 280/806 |
| 2012/0119478 A1* | 5/2012 | Lane, Jr. | B60R 22/1952 |
| | | | 280/806 |
| 2012/0146318 A1* | 6/2012 | Kim | B60R 22/1951 |
| | | | 280/806 |
| 2013/0207371 A1* | 8/2013 | Suyama | B60R 22/1951 |
| | | | 280/801.1 |
| 2016/0318473 A1* | 11/2016 | Leckliter | B60R 22/1952 |
| 2020/0062149 A1* | 2/2020 | Sekizuka | B60N 2/4221 |
| 2020/0130640 A1* | 4/2020 | Yamamoto | B60R 22/28 |

* cited by examiner

CAM BASED SEAT BELT PRETENSIONER

INTRODUCTION

The present disclosure relates to seat belts for motor vehicles. More specifically, the present disclosure relates to seat belts with cam based pretensioners.

Seat belt pretensioners remove slack from a seat belt in a collision to minimize forward or upward movement of the passenger. In many motor vehicles, a pyrotechnic device is utilized to wind up or pull in slack in the seat belt during a collision by pulling on a cable or a rotary spool in a seat belt retractor connected to a webbing associated with the seat belt. When the pretensioner is attached to the lower seat or in this proximity, the cable and webbing typically interact with an occupant that that enters and egresses from a vehicle seat. These interactions may result in the fatigue and breaking of the cable.

Thus, while current seat belt pretensioners achieve their intended purpose, there is a need for a new and improved seat belt systems that remove or minimize the interactions of an occupant that is entering or egressing from a vehicle seat.

SUMMARY

According to several aspects, a seat belt pretensioner for a motor vehicle includes a cam that rotates and a cable with a first end and a second end, a section of the cable positioned on an outer portion of the cam. Upon deployment the cam rotates and guides the first end from a first location to a second location.

In an additional aspect of the present disclosure, the cam includes a receptacle for the cable.

In another aspect of the present disclosure, the receptacle is at least one of a set of opposed tabs forming a cable routing path and a slot.

In another aspect of the present disclosure, the seat belt pretensioner further includes an attachment mechanism that couples a termination end of a seat belt webbing to the seat belt pretensioner.

In another aspect of the present disclosure, the attachment mechanism attaches to the cam in at least one of a) directly to the cam and b) via a geometric interface between the cam and the attachment mechanism.

In another aspect of the present disclosure, the attachment of the first end of the cable to the cam includes at least one of a) a slot through which the cable passes and b) a crimp at the interface between the first end of the cable and the cam.

In another aspect of the present disclosure, the attachment mechanism attaches the termination end of the seat belt webbing to the first end of the cable.

In another aspect of the present disclosure, the first end of the cable includes a crimp at the interface between the first end of the cable and the attachment mechanism.

In another aspect of the present disclosure, the attachment mechanism at least partially includes a fastener where at least one of fastener attachment torque and fastener crimp force or pressure is monitored during assembly to assure a desired attachment to the termination end of the seat belt webbing.

In another aspect of the present disclosure, the seat belt pretensioner is attached to a structure at an attachment point and the cam at least one of rotates about the attachment point and rotates about a different point than the attachment point.

In another aspect of the present disclosure, the attachment mechanism contains a mechanically separable joint so that the assembly is configured to be assembled and taken apart for service.

In another aspect of the present disclosure, the seat belt pretensioner further includes at least one of a motor that pulls a second end of the cable and a pyrotechnic device that propels a slug attached to the second end of the cable upon deployment.

In another aspect of the present disclosure, the seat belt pretensioner further includes a cover positioned over the seat belt pretensioner.

In another aspect of the present disclosure, the cover includes at least one of a slot and deformable bezel that enables access to a termination end of a seat belt webbing.

In another aspect of the present disclosure, the cam has a shape the minimizes a vertical height of the seat belt pretensioner in an undeployed state and maximizes the amount of seat belt webbing movement in a deployed state.

According to several aspects, a seat belt pretensioner for a motor vehicle includes a cam that rotates, the cam including a receptacle over a portion of the cam's outer perimeter, a cable with a first end and a second end, a section of the cable positioned in the receptacle, and a device which includes at least one of a pyrotechnic device and a motor that pulls a cable upon receipt of a deployment signal. Upon deployment the cable is pulled, the cam rotates and guides the first end from a first location to a second location.

In another aspect of the present disclosure, the seat belt pretensioner further includes an attachment mechanism that couples a termination end of a seat belt webbing to the seat belt pretensioner.

In another aspect of the present disclosure the attachment mechanism attaches to the cam in at least one of a) directly to the cam wherein the first end of the cable is attached to the cam and b) via a geometric interface between the cam and the attachment mechanism.

In another aspect of the present disclosure, the attachment mechanism attaches the termination end of the seat belt webbing to the first end of the cable.

According to several aspects, a seat belt pretensioner for a motor vehicle includes a cam, a cable with a first end and a second end, a section of the cable positioned about the cam with a temporary fixation member securing the cable to the cam, an attachment mechanism that couples a termination end of a seat belt webbing to the first end of the cable, and a device including at least one of a pyrotechnic device and a motor that pulls the second end of the cable upon receipt of a deployment signal. Upon deployment, the cable is pulled and the cam guides the first end of the cable from a first location to a second location as the temporary fixation member detaches.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
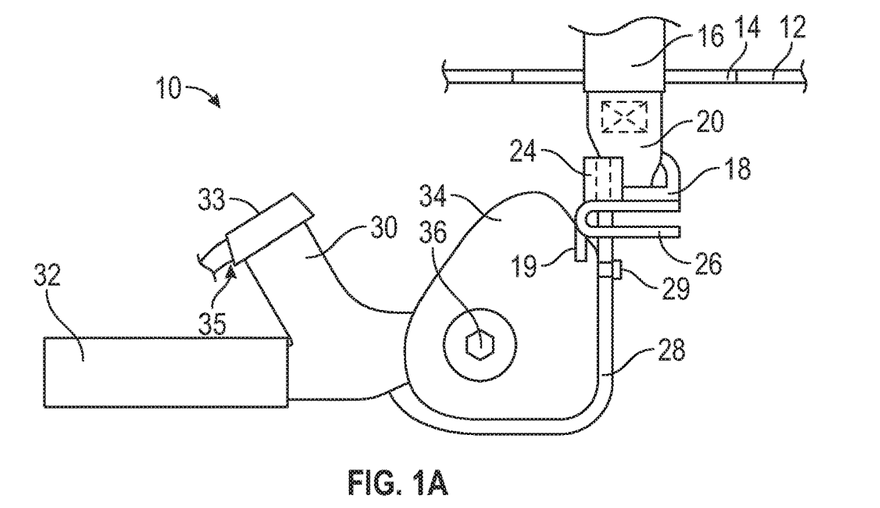
FIGS. 1A and 1B are side views of a seat belt pretensioner in accordance with an exemplary embodiment.

Referring to FIGS. 1A through 10, there is shown a seat belt pretensioner 10 for a motor vehicle in accordance with the principles of the present disclosure. The seat belt pretensioner 10 includes a cable 28 with one end attached to a seat belt webbing 16 with a coupler 18. Specifically, the seat belt webbing 16 includes a termination end 20 attached to the coupler 18, and the one end of the cable 28 is connected to a portion 26 of the coupler 18 with a nut, crimp 24 or other serviceable or non-serviceable attachment. The coupler 18 can be mechanically attached to the adjacent cam 34 or the geometry of the cam 34 can encompass a portion of the coupler 18 so that the coupler 18 moves with the cam 34. As an example, an interlocking portion 19 between the cam 34 and the coupler 18 is present to keep the two engaged prior to and during movement. As shown in FIGS. 1A and 1B, a male extension of the coupler 18 mates with a female portion in the cam 34. In various arrangements, the seat belt webbing 16 extends through an opening 14 of a guide 12.

Figure 1B:
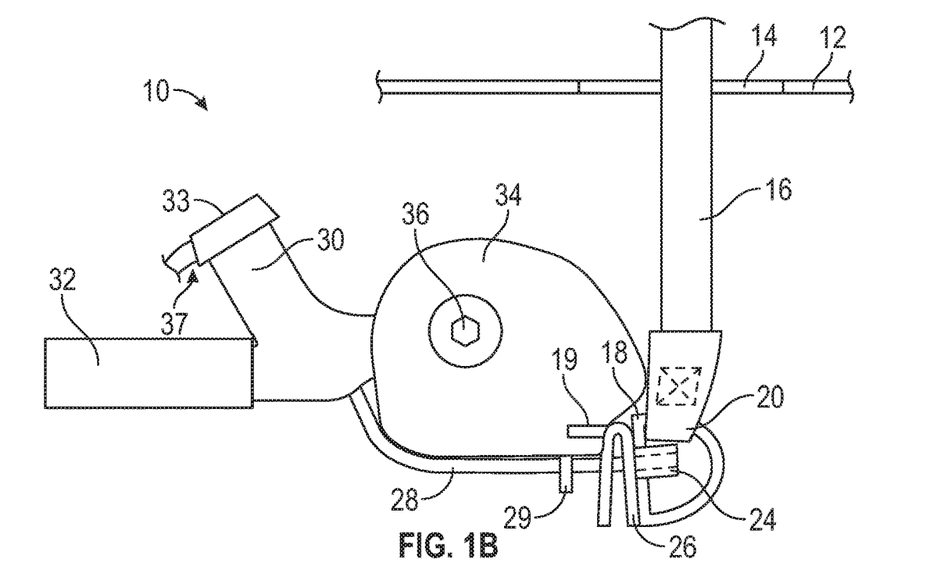
Figure 1C:
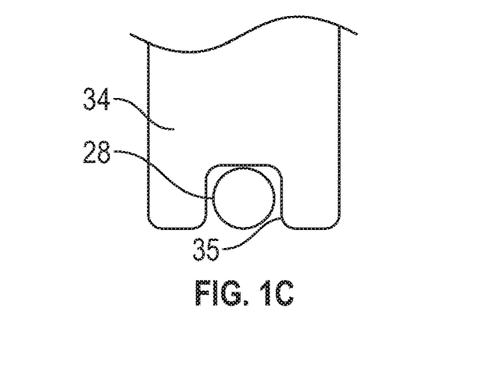
FIG. 1C is a view of channel of a cam associated with the seat belt pretensioner.

The other end of the cable 28 is attached to a pyrotechnic device 30. The cable 28 is positioned on an outer portion of a cam 34. The cam 34 rotates about a pivot point 36. In some arrangements, the cable 28 resides in a receptacle such as a channel 35 of the cam 34 to ensure that the cable 28 does not slip off the cam 34. In other arrangements, a permanent fixation member 29 holds the cable 28 onto the cam 34 so the cable 28 cannot slip off the cam 34.

Figure 3A:
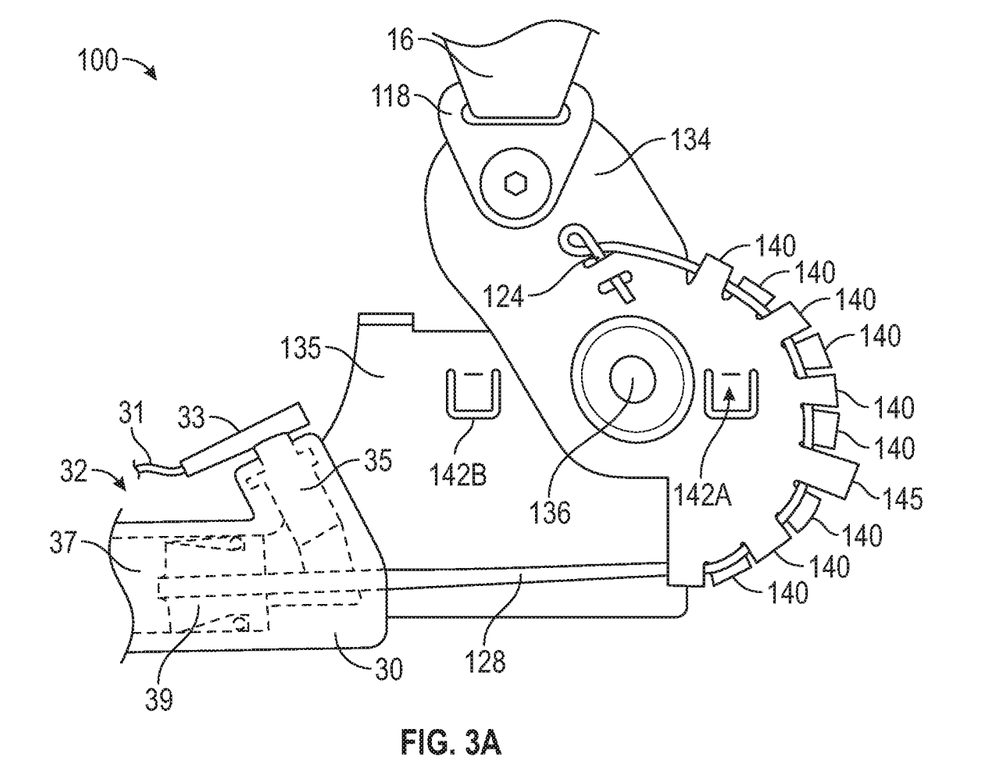
FIG. 3A is a side view of another seat belt pretensioner in accordance with an exemplary embodiment.

Further details of the pyrotechnic device 30 are shown in FIG. 3A. More specifically, the pyrotechnic device 30 includes a chamber 32 that houses an initiator 35 with a propellant and a link bolt (or slug) 39 connected to the end of the cable 28 via a mechanical means such as a crimp or other suitable attachment. The pyrotechnic device 30 also includes an electrical connecter 33 with leads 31. In addition, other types of pyrotechnic devices in the automotive industry that pull on a cable 28 can be utilized. Also, a motor could pull on the cable for a motor-powered application.

When the motor vehicle is in a collision, signals are sent from a controller through the leads 37 to the electrical connector 33, which in turn ignites the propellant in the initiator 35. The ignition of the propellant creates a gas that expands in the chamber 32. As the gas expands, the link bolt 39, is pushed away from the cam 34 along a bore or channel 39. The movement of the link bolt 39 pulls on the cable 28, which causes the cam 34 to rotate from a first position (FIG. 1A) to a second position (FIG. 1B) to apply a pretension to the seat belt webbing 16 by moving the termination end 20 from a first location to a second location. Note that the cam 34, in some arrangements, has a shape that minimizes the vertical height of the assembly in the undeployed state but maximizes the amount of seat belt webbing 16 movement in the deployed state as shown in FIGS. 1A and 1B. It is also possible to utilize a cam that does not change radius around its perimeter.

Figure 2A:
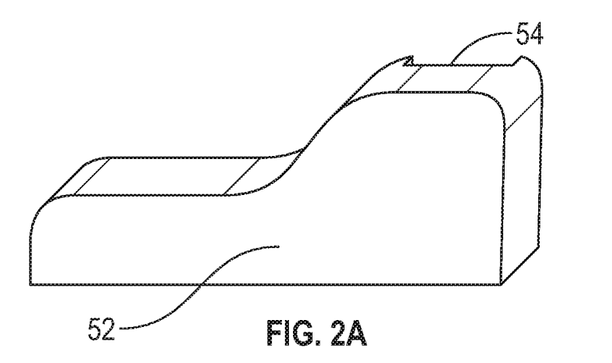
FIG. 2A is a perspective view of a cover for the seat belt pretensioner.
Figure 2B:
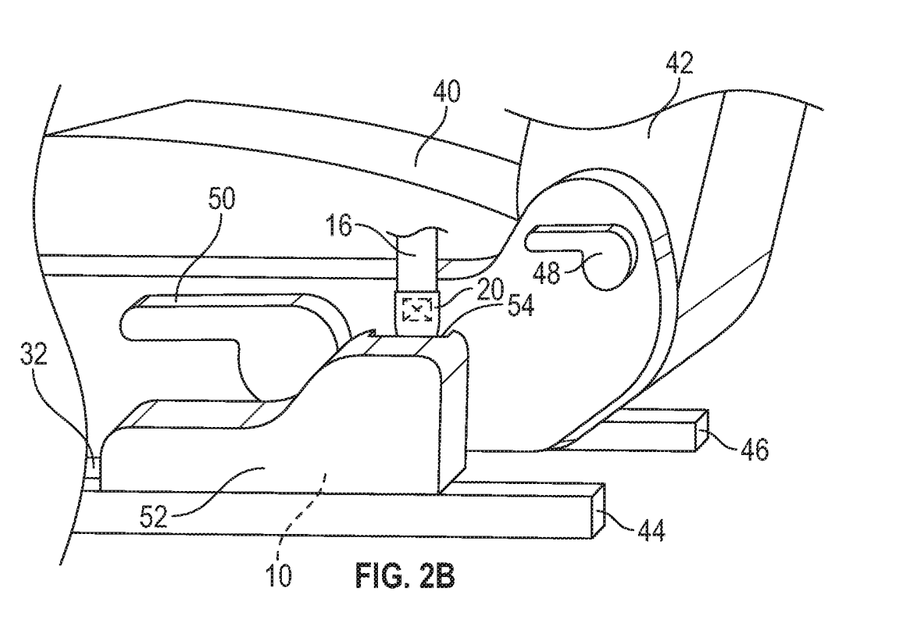
FIG. 2B is a perspective view of the seat belt pretensioner with the cover.

In various arrangements, the seat belt pretensioner 10 is associated with an occupant's seat including a seat portion 40 and a back portion 42, as shown in FIG. 2B. Typically, the seat includes a handle 48 or electrical device that enables the back portion 42 to recline relative to the seat portion 40. The seat portion 40 is usually secured to a set of rails 44 and 46 that are in turn attached to a vehicle. The seat portion 40 is able to translate along the rails 44 and 46 and is able to move up and down relative to the rails 44 and 46. The movement of the seat is controlled by a handle 50 in particular arrangements or by an electrical device in other arrangements. In certain arrangements, a cover 52 (see also FIG. 2A) is placed over the seat belt pretensioner 10 to keep debris from entering into the seat belt pretensioner 10. The cover 52 includes a slot 54 for the seat belt webbing 16 to enter into the cover 52.

Referring now to FIG. 3A, there is shown another seat belt pretensioner 100. The seat belt pretensioner 100 includes a bracket 135 to which a cam 134 is connected at a pivot point 136. The cam 134 is connected to the seat belt webbing 16 with a coupler 118. A cable 128 has a terminal end 124 attached to the cam 134 and another end connected to the link bolt 39. Again, a collision of the motor vehicle activates the pyrotechnic device 30 to pull the cable 128 which in turn rotates the cam 134 clockwise.

In various arrangements, the cable 128 is guided around the perimeter of the cam 134 with receptacle formed by a set of bent tabs 140. In certain arrangements, the cam 134 includes an extended tab 145 that ultimately engages with a stop 142B on the bracket 135 as the cam 134 rotates clockwise to prevent over rotation of the cam 134. In other arrangements, the cam 134 includes a stop 142A that ultimately engages with the stop 142B to prevent over rotation of the cam 134.

Figure 3B:
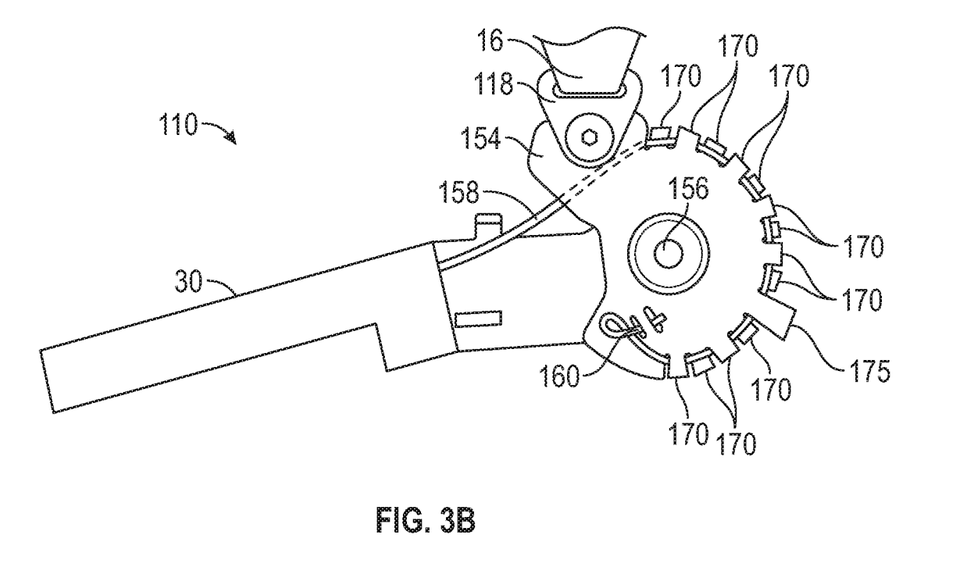
FIG. 3B is a side view of yet another seat belt pretensioner in accordance with an exemplary embodiment.

Referring to FIG. 3B, there is shown yet another seat belt pretensioner 110. The seat belt pretensioner 110 includes a cam 154 that rotates about a pivot point 156 and is attached to the seat belt webbing 16 with the coupler 118. The cam 154 includes a receptacle consisting of a set of bent tabs 170 that guide a cable 158 around the perimeter the cam 154. One end of the cable 160 is attached to the cam 154 and the other end is attached to the link bolt housed in the pyrotechnic device 30. In various arrangements, the seat belt pretensioner 110 includes stops such as those shown for the seat belt pretensioner 100, for example, an extended tab 175.

Referring now to FIGS. 4A through 4F, there are shown various arrangements to connect the cable 128 to the cam 134 of the seat belt pretensioner 100 shown in FIG. 3A. Note that similar connections are utilized in various arrangements for the seat belt pretensioner 110 shown in FIG. 3B.

Figure 4A:
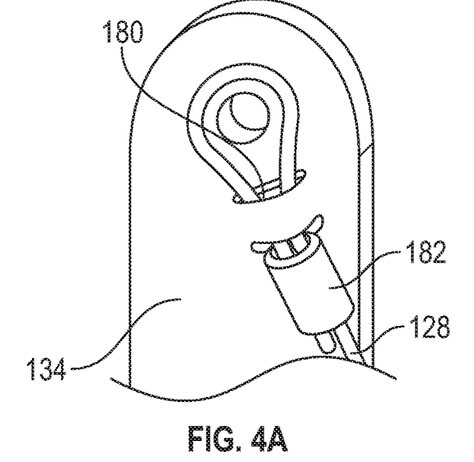
FIGS. 4A-4F show alternative connections between a cam and a cable in accordance with an exemplary embodiment.
Figure 4B:
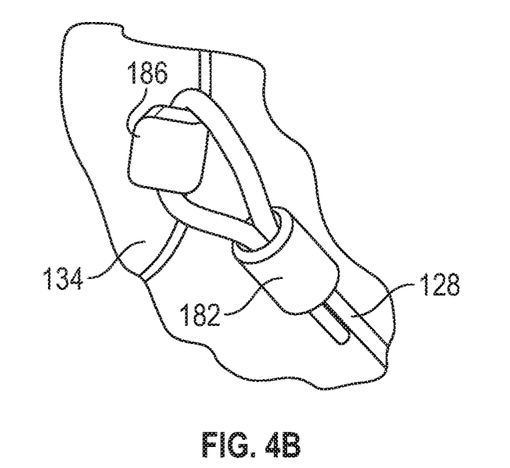
Figure 4C:
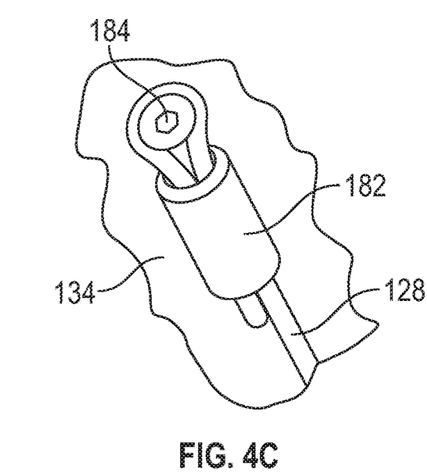
Figure 4D:
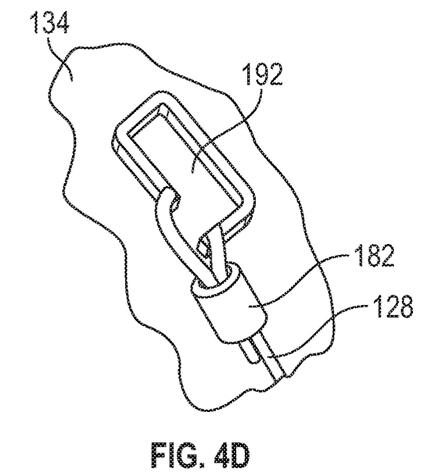
Figure 4E:
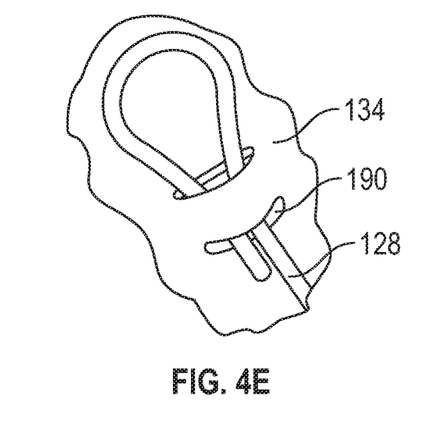
Figure 4F:
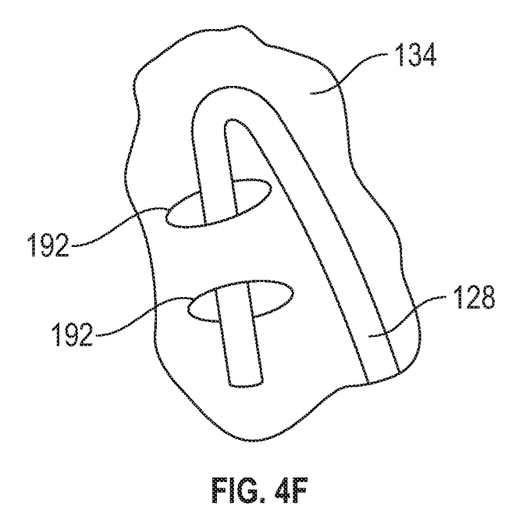

In FIG. 4A, the cable is looped around, for example, the connection point 180 between the coupler 118 and the cam 134. The end of the cable 128 is connected to the remainder of the cable 128 with, for example, a crimp 182. In another arrangement, shown in FIG. 4B, the cable 128 is looped over a tab 186 on the cam 134. In some arrangements, the cable 128 is secured to the cam 134 with a bolt 184, as shown in FIG. 4C. In other arrangements, the cable 128 is looped over a tab 192 formed from the surface of the cam 134. In particular arrangements, the end of cable 128 is doubled up and passed through a double slot 190 in the cam 134. And yet in another arrangement, the end of the cable 128 is secured to the cam 134 by passing the end of the cable 128 through a pair of slots 192.

Figure 5:
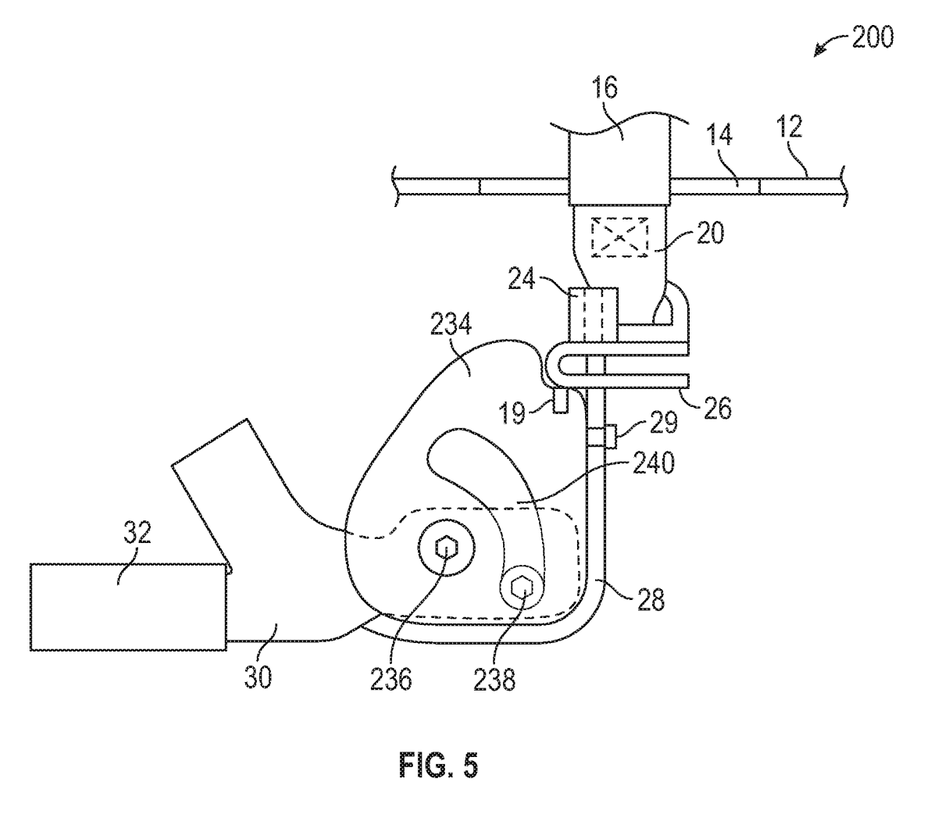
FIG. 5 is a side view of yet another seat belt pretensioner in accordance with an exemplary embodiment.
Figure 6:
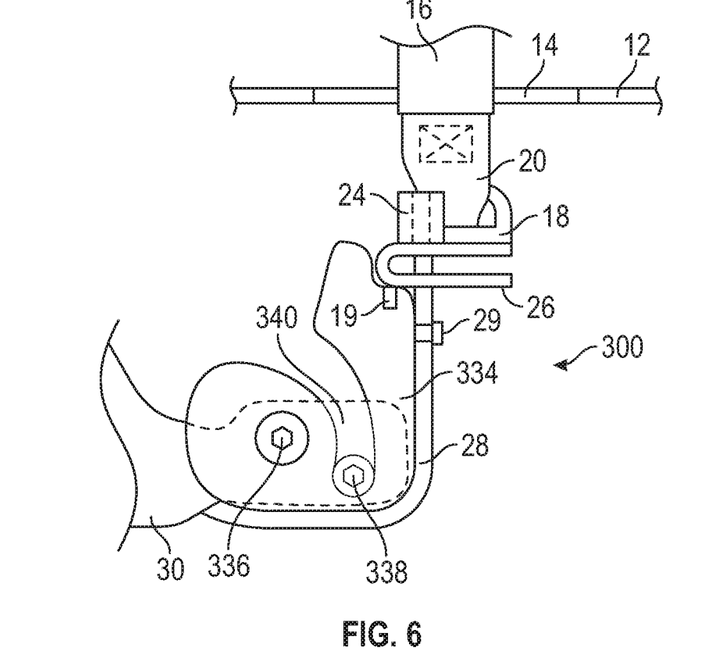
FIG. 6 is a side view of yet another seat belt pretensioner in accordance with an exemplary embodiment.

Referring to FIG. 5, there is shown another seat belt pretensioner 200. Features similar to the above described seat belt pretensioner 10 are identified by like reference numbers. The seat belt pretensioner 200 incudes a cam 234 with a closed slot 240. The cam 234 rotates about a pivot point 236 such that the slot 240 moves along a stationary peg or post 238, attached, for example, to the seat or vehicle body, as the cam 234 rotates about the pivot point 236. In another arrangement identified as a seat belt pretensioner 300 shown in FIG. 6, a cam 334 includes an open slot 340 that moves along a stationary peg or post 338, attached, for example, to the seat or vehicle body, as the cam 334 rotates about a pivot point 336.

Figure 7:
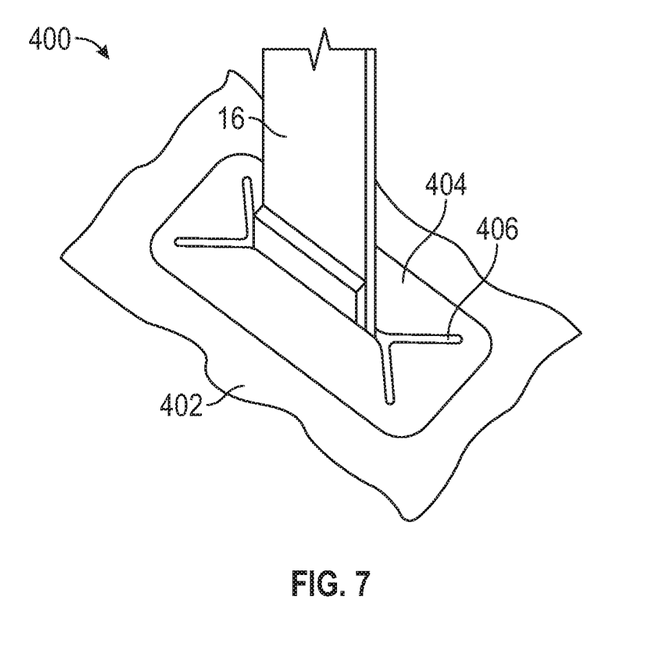
FIG. 7 shows a bezel for a cover of a seat belt pretensioner in accordance with an exemplary embodiment.

Referring to FIG. 7, various arrangements of the aforementioned seat belt pretensioners include a cover 400, similar to the aforementioned cover 52, with a bezel 402 rather than an opening. The bezel 402 incudes, for example, a flexible insert 404 with a set of slots 406 to enable the insert 404 to deform as the seat belt webbing 16 moves in and out of the cover 400 or for assembly and service access to the coupler 18. The bezel 402 provides a further barrier to debris entering the seat belt pretensioner and creates a path for the seat belt webbing.

Figure 8A:
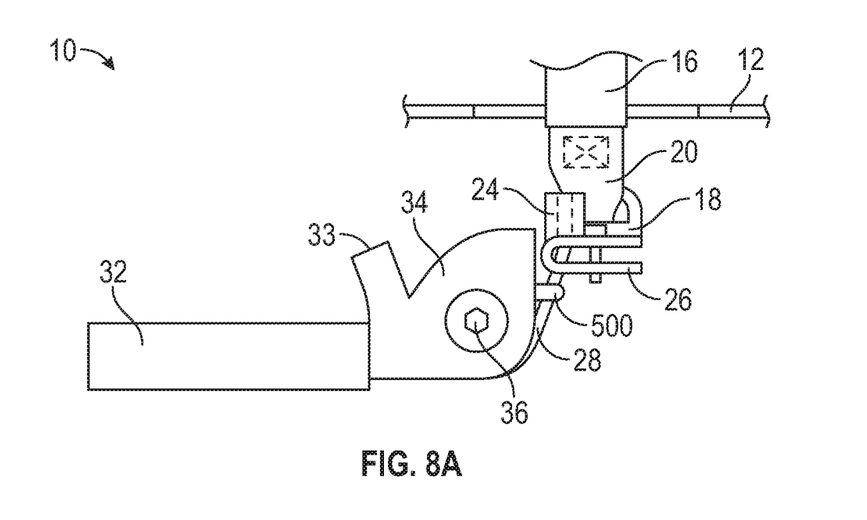
FIGS. 8A and 8B are side views of yet another seat belt pretensioner in accordance with an exemplary embodiment.
Figure 8B:
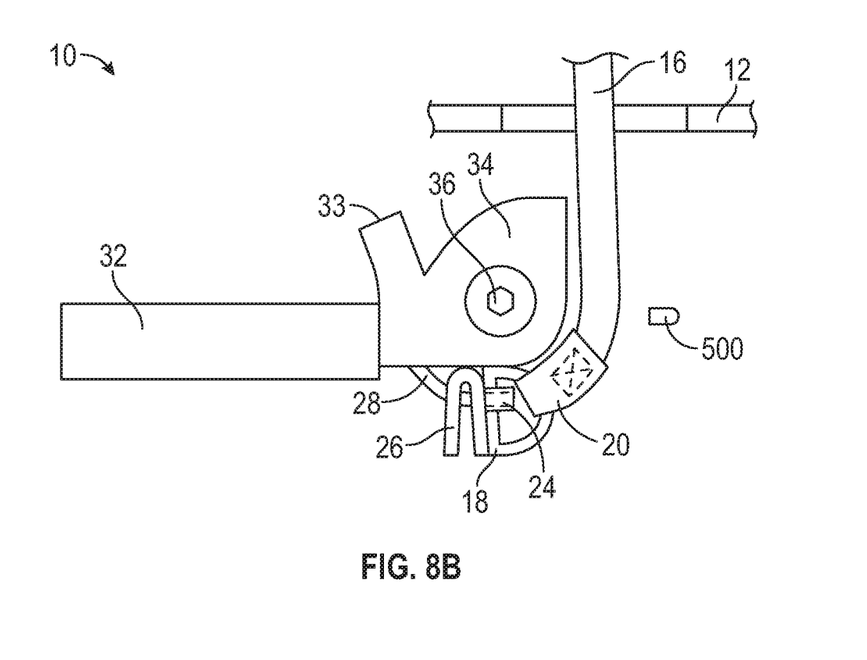

Referring now to FIGS. 8A and 8B, there are shown the seat belt pretensioner 10 with an optional temporary fixation member 500. When the seat belt pretensioner 10 is undeployed (FIG. 8A) the temporary fixation member 500 secures the cable to 28 to the cam 34. As the seat belt pretensioner 10 is being deployed (FIG. 8B), the temporary fixation member detaches. Note in this case the cam 34 does not rotate. The cam 34 perimeter guides the cable 28 and the coupler 18.

Figure 9A:
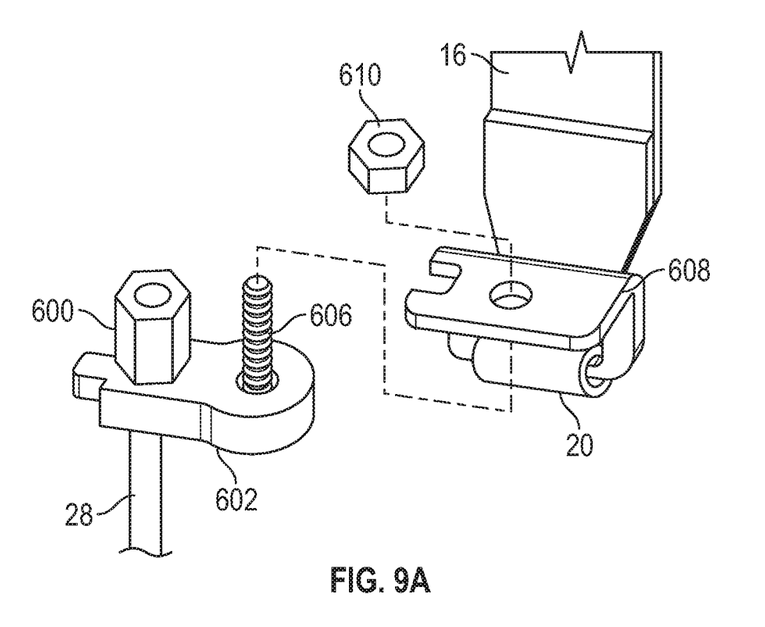
FIGS. 9A-9F show various cable to seat belt webbing attachments in accordance with an exemplary embodiment.
Figure 9B:
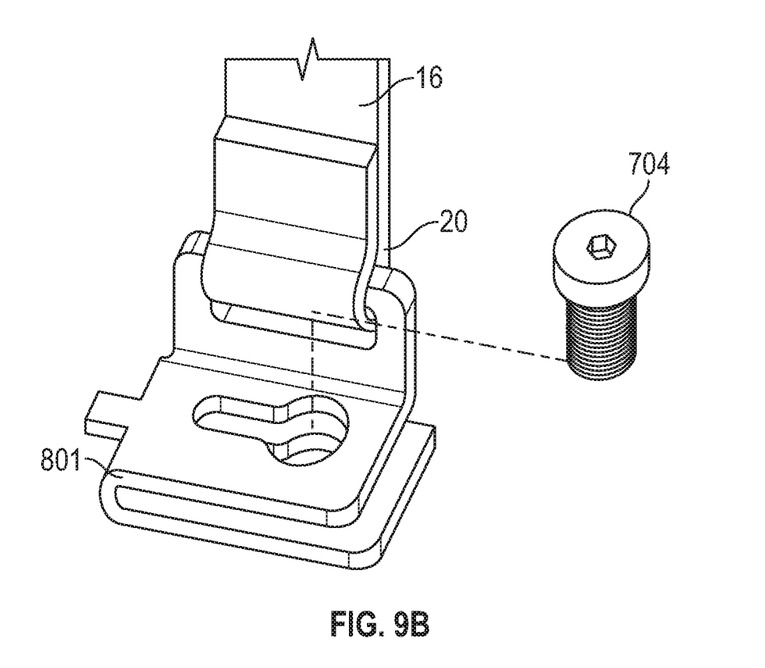
Figure 9C:
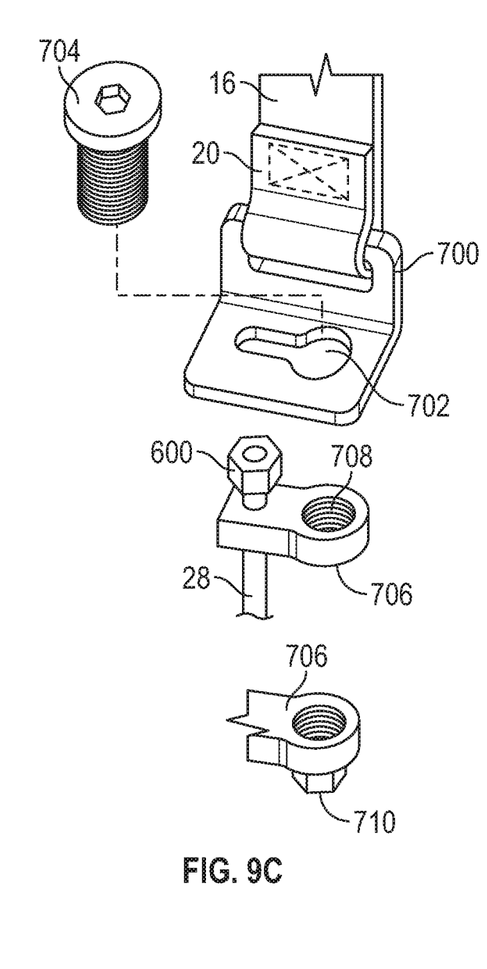
Figure 9D:
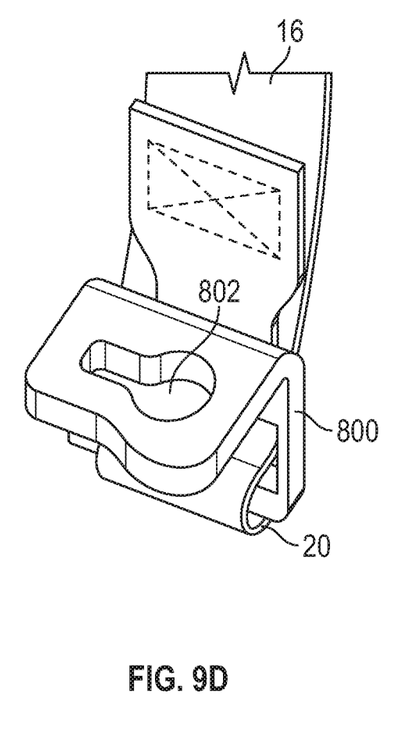
Figure 9E:
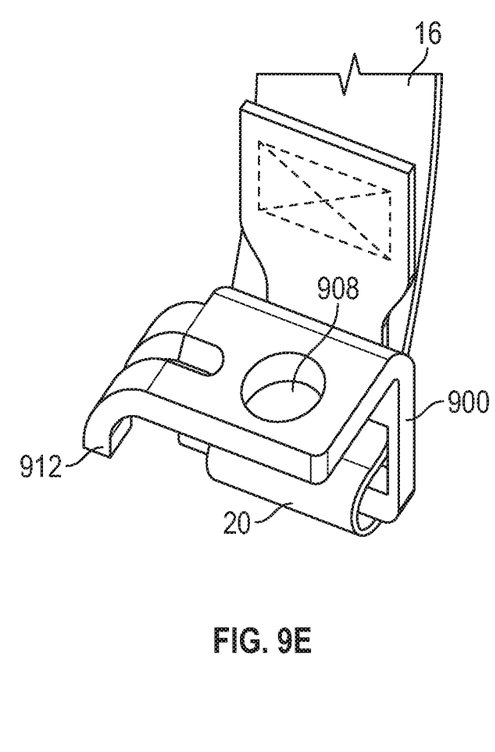
Figure 9F:
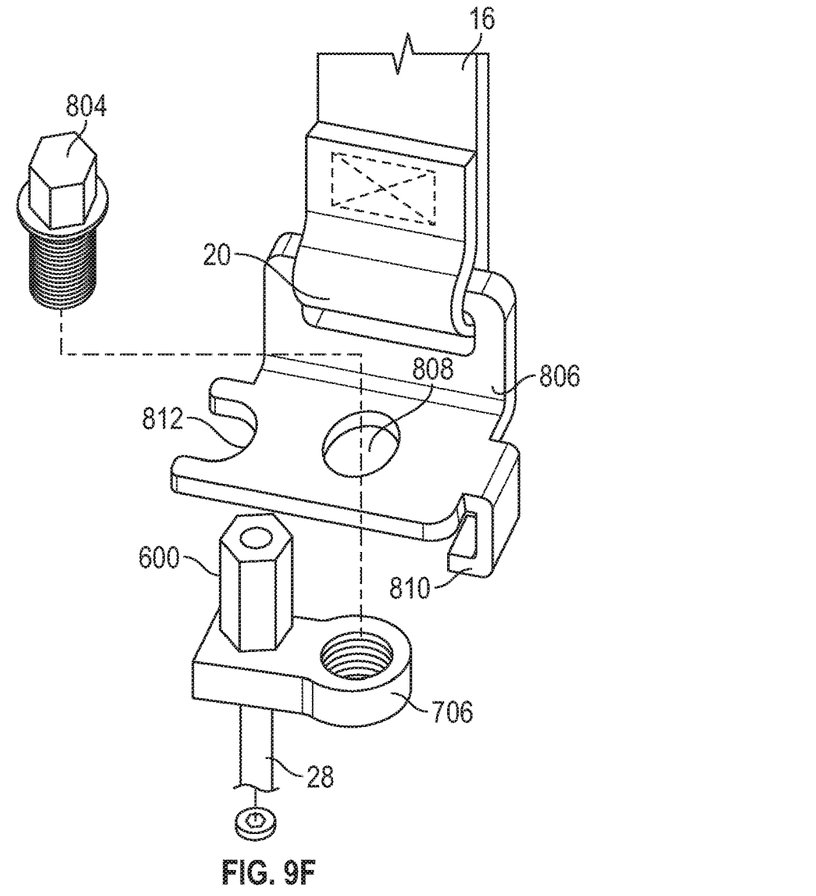

Turning now to FIGS. 9A through 9F, there are shown other attachment mechanisms to attach any of the aforementioned seat belt webbings to a respective cable. Shown in FIG. 9A, the cable 28 is attached to a connector 602 with a crimped on or otherwise mechanically attached nut 600. The connector 602 in turn is connected to a coupler 608 attached to the seat belt webbing 16 with a screw 606 and nut 610. Note that the attachment point between the connector 602 and the coupler 608 is above the termination end 20 of the webbing 16. Shown in FIG. 9B, is a coupler 801 in which a screw 704 connects the connector 602 below the termination end 20. FIG. 9C shows the screw 704 passing through an opening 702 of a coupler 700 and being screwed into threads 708 of a connector 706 or attached to the connector 706 with a nut 710. Likewise screw 704 of FIG. 9B can be screwed into threads 708 of a connector 706 or a nut 710 of FIG. 9C. FIG. 9D shows an alternative coupler 800 with the termination end 20 of the seat belt webbing 16 positioned below the attachment point 802. FIG. 9E shows yet another coupler 900. The coupler 900 includes an attachment point 908 and an interlocking portion 912 to prevent the coupler 900 from slipping out from the connector 706 and cable 28 of FIG. 9C. And shown in FIG. 9F is another coupler 806. The coupler 806 includes an opening 808 and a bolt 804 that extends through the opening 808. The bolt 804 is threaded into the connector 706. The coupler 806 includes an interlocking portion 810 to secure the connector 706 to the coupler 806. The coupler 806 also includes an opening for the nut 600 that secures the cable 28 to the connector 706.

Figure 10A:
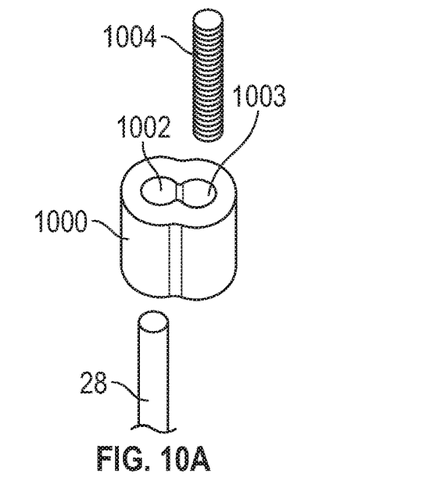
FIGS. 10A and 10B show connectors for a cable to webbing attachments in accordance with an exemplary embodiment.
Figure 10B:
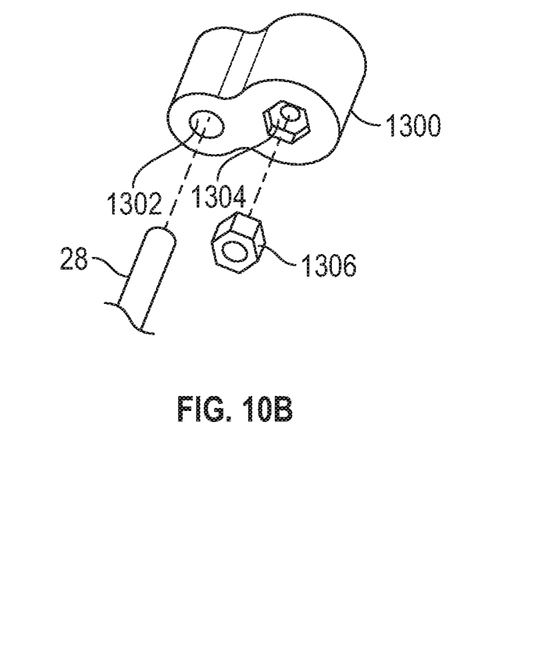

Referring now to FIGS. 10A and 10B, there are shown various arrangements to connect the cable 28 to a connector that is connected to a coupler to the aforementioned seat belt webs. Shown in FIG. 10A is a connector 1000 in which the cable 28 passes through passage 1002 and a screw 1004 passes through passage 1003 or is otherwise threaded into passage 1003 in the connector 1000. This assembly is crimped in some arrangements to hold cable 28, connector 1000, and screw 1004 together to secure the connector 1000 to a seat belt coupler. Shown in FIG. 10B, a connector 1300 includes an opening for the cable 28 and a recess 1304 for a nut 1306 to connect, for example, a screw that connects the connector 1300 to a coupler for a seat belt webbing.

Figure 11A:
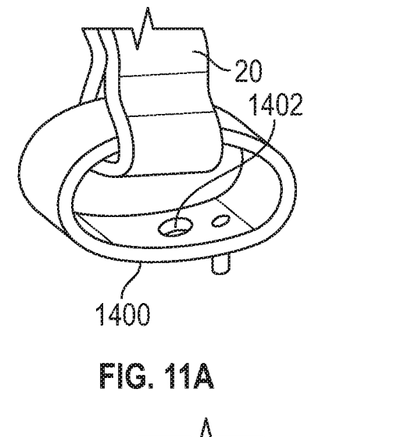
FIGS. 11A-11D show yet other cable to seat belt webbing attachments in accordance with an exemplary embodiment.
Figure 11B:
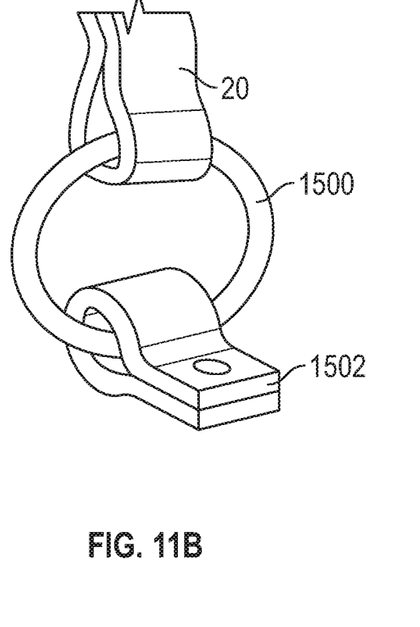
Figure 11C:
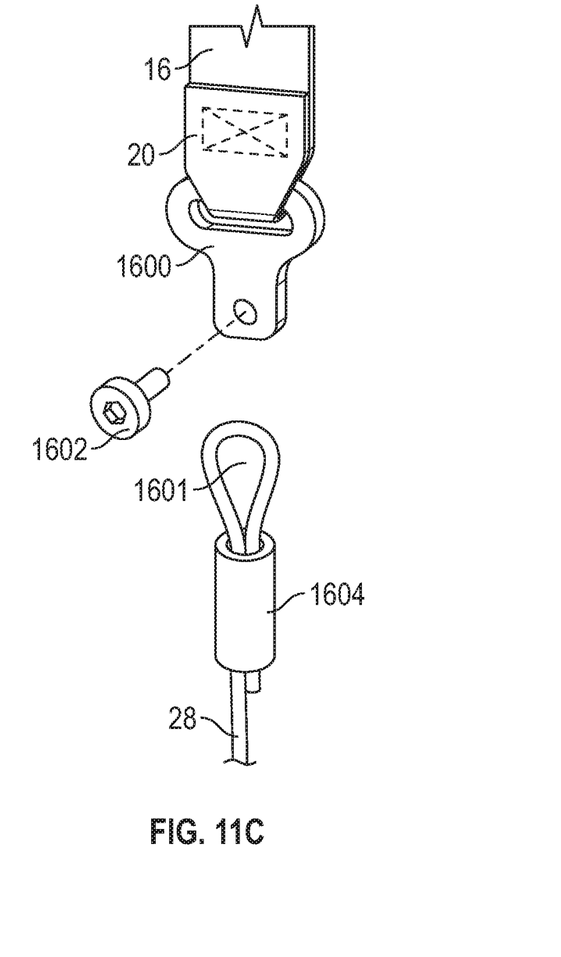
Figure 11D:
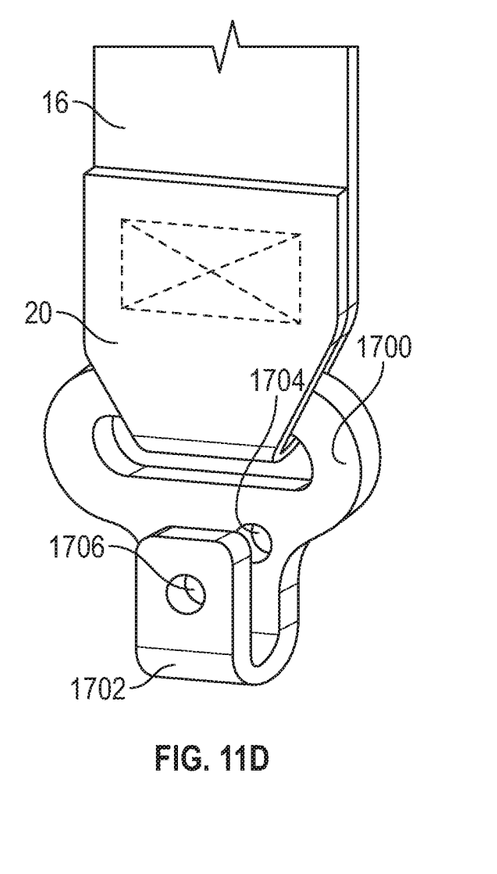

Referring now to FIGS. 11A through 11D, there are shown yet other arrangements to connect a seat belt webbing to a cable. Shown in FIG. 11A, is coupler 1400 attached to the termination end 20. The coupler 1400 includes a hole or opening 1402 that facilitates connecting the coupler 1400 to a cable. Shown in FIG. 11B is coupler 1500 that is connected to a connector 1502 that connects to a cable. FIG. 11C shows a loop 1601 formed by a crimped casing 1604. The loop 1601 is attached to a coupler 1600 with a screw 1602. And shown in FIG. 11D is a coupler 1700 with an end portion 1702. The end portion 1702 includes two vertical holes that facilitate connected a cable with an appropriate connector with a vertical mating surface to the coupler 1700.

Within the present disclosure, elements from one embodiment can be incorporated into other embodiments. In addition, attachments involving threaded fasteners can be torque monitored so that proper attachment can be verified and attachments involving crimps can be force or pressure monitored so that proper attachment can be verified.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat belt pretensioner for a motor vehicle, the seat belt pretensioner comprising:
    a seat belt webbing including a termination end;
    a seat belt guide defining an opening, wherein the seat belt webbing extends through the opening in the seat belt guide;
    a cam that rotates about a pivot point, the cam defining a radius and an outer perimeter, wherein the radius is measured from the pivot point and the outer perimeter of the cam is irregularly shaped, and wherein a length of the radius of the cam varies around the outer perimeter of the cam, and wherein the cam is actuated from a first position to a second position to apply a pretension to the seat belt webbing by moving the termination end of the seat belt webbing from a first location to a second location, and wherein a vertical height measured from the termination end of the seat belt webbing is reduced as the cam rotates from the first position to the second position, and wherein the length of the radius varies around the outer perimeter of the cam so a maximum length of the radius of the cam forms an apex around the outer perimeter of the cam, and the apex of the cam is aligned with the termination end of the seat belt webbing when the cam is in the second position; and a cable with a first end and a second end, a section of the cable positioned on an outer portion of the cam, wherein upon deployment the cam rotates and guides the first end of the cable from the first location to the second location of the termination end of the seat belt webbing.

2. The seat belt pretensioner of claim 1, wherein the cam includes a receptacle for the cable.

3. The seat belt pretensioner of claim 2, wherein the receptacle is at least one of a set of opposed tabs forming a cable routing path and a slot.

4. The seat belt pretensioner of claim 1, further comprising an attachment mechanism that couples the termination end of the seat belt webbing to the seat belt pretensioner.

5. The seat belt pretensioner of claim 4, wherein the attachment mechanism attaches to the cam in at least one of a) directly to the cam and b) via a geometric interface between the cam and the attachment mechanism.

6. The seat belt pretensioner of claim 4, wherein the attachment of the first end of the cable to the cam includes at least one of a) a slot through which the cable passes and b) a crimp at an interface between the first end of the cable and the cam.

7. The seat belt pretensioner of claim 4, wherein the attachment mechanism attaches the termination end of the seat belt webbing to the first end of the cable.

8. The seat belt pretensioner of claim 7, wherein the first end of the cable includes a crimp at an interface between the first end of the cable and the attachment mechanism.

9. The seat belt pretensioner of claim 4, wherein the attachment mechanism at least partially includes a fastener where at least one of fastener attachment torque and fastener crimp force or pressure is monitored during assembly to assure a desired attachment to the termination end of the seat belt webbing.

10. The seat belt pretensioner of claim 1, wherein the seat belt pretensioner is attached to a structure at an attachment point and the cam at least one of rotates about the attachment point and rotates about a different point than the attachment point.

11. The seat belt pretensioner of claim 1, wherein the attachment mechanism contains a mechanically separable joint so that an assembly is configured to be assembled and taken apart for service.

12. The seat belt pretensioner of claim 1, further comprising at least one of a motor that pulls a second end of the cable and a pyrotechnic device that propels a slug attached to the second end of the cable upon the deployment.

13. The seat belt pretensioner of claim 1, further comprising a cover positioned over the seat belt pretensioner.

14. The seat belt pretensioner of claim 13, wherein the cover includes at least one of a slot and deformable bezel that enables access to a termination end of a seat belt webbing.

15. The seat belt pretensioner of claim 1, wherein the cam has a shape that minimizes a vertical height of the seat belt pretensioner in an undeployed state and maximizes an amount of seat belt webbing movement in a deployed state.

16. A seat belt pretensioner for a motor vehicle, the seat belt pretensioner comprising:

a seat belt webbing including a termination end;

a seat belt guide defining an opening, wherein the seat belt webbing extends through the opening in the seat belt guide;

a cam that rotates, the cam including a receptacle over a portion of an outer perimeter of the cam, a pivot point, and a radius, wherein the radius is measured from the pivot point and the outer perimeter of the cam and is irregularly shaped, and wherein a length of the radius of the cam varies around the outer perimeter of the cam, and wherein the cam is actuated from a first position to a second position to apply a pretension to the seat belt webbing by moving the termination end of the seat belt webbing from a first location to a second location, and wherein a vertical height measured from the termination end of the seat belt webbing is reduced as the cam rotates from the first position to the second position, and wherein the length of the radius varies around the outer perimeter of the cam so a maximum length of the radius of the cam forms an apex around the outer perimeter of the cam, and the apex of the cam is aligned with the termination end of the seat belt webbing when the cam is in the second position;

a cable with a first end and a second end, a section of the cable positioned in the receptacle; and a device which includes at least one of a pyrotechnic device and a motor that pulls the cable upon receipt of a deployment signal, wherein upon deployment the cable is pulled, the cam rotates and guides the first end of the cable from the first location to the second location of the termination end of the seat belt webbing.

17. The seat belt pretensioner of claim 16, further comprising an attachment mechanism that couples the termination end of the seat belt webbing to the seat belt pretensioner.

18. The seat belt pretensioner of claim 17, wherein the attachment mechanism attaches to the cam in at least one of a) directly to the cam wherein the first end of the cable is attached to the cam and b) via a geometric interface between the cam and the attachment mechanism.

19. The seat belt pretensioner of claim 17, wherein the attachment mechanism attaches the termination end of the seat belt webbing to the first end of the cable.

20. A seat belt pretensioner for a motor vehicle, the seat belt pretensioner comprising:

a seat belt webbing including a termination end;

a seat belt guide defining an opening, wherein the seat belt webbing extends through the opening in the seat belt guide;

a cam that rotates about a pivot point, wherein the cam includes a radius and an outer perimeter, wherein the radius is measured from the pivot point and the outer perimeter of the cam and is irregularly shaped, and wherein a length of the radius of the cam varies around the outer perimeter of the cam, the cam being actuated from a first position to a second position to apply a pretension to the seat belt webbing by moving the termination end of the seat belt webbing from a first location to a second location, and wherein a vertical height measured from the termination end of the seat belt webbing is reduced as the cam rotates from the first position to the second position, and wherein the length of the radius varies around the outer perimeter of the cam so a maximum length of the radius of the cam forms an apex around the outer perimeter of the cam, and the apex of the cam is aligned with the termination end of the seat belt webbing when the cam is in the second position;

a cable with a first end and a second end, a section of the cable positioned about the cam with a temporary fixation member securing the cable to the cam;

an attachment mechanism that couples the termination end of a seat belt webbing to the first end of the cable; and a device including at least one of a pyrotechnic device and a motor that pulls the second end of the cable upon receipt of a deployment signal, wherein upon deployment, the cable is pulled and the cam guides the first end of the cable from the first location to the second location of the termination end of the seat belt webbing as the temporary fixation member detaches from the cam.

* * * * *